(12) United States Patent  (10) Patent No.: US 7,684,148 B2
Biskeborn  (45) Date of Patent: Mar. 23, 2010

(54) MAGNETIC HEAD WITH A CONDUCTIVE UNDERLAYER ABOVE SUBSTRATE

(75) Inventor: Robert Glenn Biskeborn, Hollister, CA (US)

(73) Assignee: International Business Machines Corporation, Armonk, NY (US)

(*) Notice: Subject to any disclaimer, the term of this patent is extended or adjusted under 35 U.S.C. 154(b) by 950 days.

(21) Appl. No.: 11/424,807

(22) Filed: Jun. 16, 2006

(65) Prior Publication Data

US 2007/0291408 A1    Dec. 20, 2007

(51) Int. Cl.
*G11B 5/265* (2006.01)
(52) U.S. Cl. .................... 360/121; 360/316
(58) Field of Classification Search ............ 360/121, 360/316
See application file for complete search history.

(56) References Cited

U.S. PATENT DOCUMENTS

| 5,764,446 | A * | 6/1998 | Seagle ........................ 360/322 |
| 6,252,741 | B1 | 6/2001 | Ahn ........................ 360/235.1 |
| 6,319,325 | B1 | 11/2001 | Hiratsuka et al. ............ 118/718 |
| 6,594,121 | B1 | 7/2003 | Saito ............................ 360/314 |
| 7,472,471 | B2 * | 1/2009 | Sasaki et al. .............. 29/603.16 |
| 2004/0037003 | A1 | 2/2004 | Tsubota et al. .............. 360/126 |
| 2004/0060163 | A1 | 4/2004 | Biskeborn et al. ........ 29/603.01 |
| 2005/0029629 | A1 | 2/2005 | Noguchi et al. ............. 257/627 |

FOREIGN PATENT DOCUMENTS

| CN | 1758340 | 4/2006 |
| EP | 0133916 B1 | 3/1985 |
| JP | 2002076470 A | 3/2002 |
| WO | 2005/086889 A2 | 9/2005 |

* cited by examiner

*Primary Examiner*—A. J. Heinz
(74) *Attorney, Agent, or Firm*—Kilka-Kotab, PC

(57) ABSTRACT

A magnetic head includes a wafer substrate and a conductive underlayer formed directly on the substrate. An insulating layer is formed above the conductive layer. A reader and/or writer thereof is formed above the insulating layer. Another magnetic head includes a substrate and an insulating underlayer formed above the substrate. A conductive underlayer is formed above the insulating underlayer. An insulating layer is formed above the conductive underlayer. At least one device is formed above the insulating layer, the at least one device being selected from a group consisting of readers, writers, and combinations thereof. Tape drive systems and methods for forming such heads are also presented.

20 Claims, 8 Drawing Sheets

MAGNETIC HEAD WITH A CONDUCTIVE UNDERLAYER ABOVE SUBSTRATE

FIELD OF THE INVENTION

The present invention relates to magnetic head structures, and more particularly, this invention relates to a magnetic head structure having a conductive underlayer deposited between the wafer and the nearest shield.

BACKGROUND OF THE INVENTION

Business, science and entertainment applications depend upon computers to process and record data. In these applications, large volumes of data are often stored or transferred to nonvolatile storage media. This storage media may include magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved error correction techniques, and decreased areal bit sizes. The data capacity of half-inch magnetic tape, for example, is currently measured in hundred of gigabytes on 512 or more data tracks.

The improvement in magnetic medium data storage capacity arises in part from improvements in the magnetic head assembly used for reading and writing data on the magnetic storage medium. A major improvement in transducer technology arrived with the magnetoresistive (MR) sensor originally developed by the IBM Corporation. The MR sensor transduces magnetic field changes in an MR stripe to resistance changes, which are processed to provide digital signals. Data storage density can be increased because a MR sensor offers signal levels higher than those available from conventional inductive read heads for a given read track width. Moreover, the MR sensor output signal depends only on the instantaneous magnetic field intensity in the storage medium and is independent of the magnetic field time-rate-of-change arising from relative sensor/medium velocity.

The quality of data stored on a magnetic tape may be increased by increasing the number of data tracks on the tape, which also decreases the distance between adjacent tracks and forces neighboring read/write heads closer together. More tracks are made possible by reducing feature sizes of the read and write elements, such as by using thin-film fabrication techniques and MR sensors. In operation the magnetic storage medium, such as tape or a magnetic disk surface, is passed over the magnetic read/write (R/W) head assembly for reading data therefrom and writing data thereto. In modern magnetic tape recorders adapted for computer data storage, read-while-write capacity with MR sensors is an essential feature for providing fully recoverable magnetically stored data. The interleaved R/W magnetic tape head with MR sensors allows increased track density on the tape medium while providing bi-directional read-while-write operation of the tape medium to give immediate read back verification of data just written onto the tape medium. A read-while-write head assembly includes, for each of one or more data tracks, a write element in-line with a read element, herein denominated a R/W track pair, wherein the gap of the read element is aligned with the gap of the write element, with the read element positioned downstream of the write element in the direction of medium motion. By continually reading just-recorded data, the quality of the recorded data is immediately verified while the original data is still available in temporary storage in the recording system. In the interleaved head, the R/W track-pairs are interleaved to form two-rows of alternating read and write elements. Alternate columns (track-pairs) are thereby disposed to read-after-write in alternate directions of tape medium motion. Tape heads suitable for reading and writing on high-density tapes require precise alignment of the track-pair elements in the head assembly.

FIG. 1 illustrates a head 100 which can also function as a read-while-write head. As shown, the head includes several R/W transducer pairs 102 in a "piggyback" configuration. Servo readers 104 are positioned on the outside of the array of R/W transducer pairs 102. The servo readers 104 follow servo tracks for the particular data "band" of the tape being read or written to. Thus, signals from the servo readers are used to keep the head aligned with the band. The tape may have a single data band, or many data bands, and each band may have one or more servo tracks.

When the head is constructed, layers are formed on a substrate 110 in generally the following order for the R/W transducer pairs 102: an electrically insulative layer 112, a first shield (S1) 114 formed directly on the insulative layer 112, a sensor 116 also known as a read transducer, a second shield (S2) 118, and first and second writer pole tips (P1, P2) 120, 122. Note also that the second shield 118 and first writer pole tip 120 may be merged into a single structure.

Tape heads are constantly contacting the tape media during reading, writing and locating. This continuous contact can degrade head performance, resulting in an increase in error rates. Degradation can be caused by a variety of mechanisms. One is head wear caused by motion of the magnetic recording tape. Repeated passes of the tape medium over the tape head surface may eventually wear away some of the surface, which can impair head performance. This can be a particular problem for thin-film magnetic heads where the thin-film layer structure is less wear resistant than the tape supporting head portions, possibly leading to an unacceptably short lifetime for the magnetic head assembly. Very hard wear-resistant layers such as diamond-like carbon or titanium-carbide on the air bearing surfaces of magnetic heads inhibit gap erosion. However, such layers must be very thin, being perhaps 20 nanometers thick to ensure close head-tape spacing. Because they must be so thin, they tend to wear off over time.

Another magnetic head performance degradation problem is due to pitting and clogging of the insulation layer positioned between the substrate and nearest shield. It is believed that charging of the tape running over the head coupled with biasing of the shields and/or substrate can create high electric fields between head and tape and in the insulating layer, and cause electrostatic attraction of debris and even breakdown. This in turn tends to fracture or otherwise damage the insulating layer, forming pits therein. The pits become regions for debris accumulation, which in turn causes a variety of problems including shorting across the insulating layer and lifting of the tape away from the transducers. Also, the irregular electric field distribution in the preferred wafer substrate material $Al_2O_3$—TiC, or "AlTiC", has hot spots at TiC grain corners. One solution to this problem has been contemplated. Heads may be made out of alternative ceramic wafers. However, other wafer materials are found to be less desirable due to generally poorer wear, fabrication issues, and heat conduction characteristics.

Another idea has been to make the undercoat thicker to reduce the fields. However, this resulted in more pronounced, wear. A thinner undercoat would seem desirable, but is found to have little benefit due to high fields and faster clogging.

There is accordingly a clearly-felt need in the art for a read/write head assembly with improved reliability. These unresolved problems and deficiencies are clearly felt in the art and are solved by this invention in the manner described below.

SUMMARY OF THE INVENTION

A magnetic head according to one embodiment of the present invention includes a wafer substrate and a conductive underlayer formed on the substrate. An insulating layer is formed above the conductive layer. At least one device is formed above the insulating layer. The at least one device is selected from a group consisting of readers, writers, and combinations thereof. In a preferred embodiment, the conductive underlayer is formed directly on the substrate.

A magnetic head according to another embodiment of the present invention includes a substrate and an insulating underlayer formed above the substrate. A conductive underlayer is formed above the insulating underlayer. An insulating layer is formed above the conductive underlayer. At least one device is formed above the insulating layer. The at least one device is selected from a group consisting of readers, writers, and combinations thereof.

A magnetic head according to another embodiment of the present invention includes a wafer substrate. At least one device is formed above the wafer substrate. The at least one device is selected from a group consisting of readers, writers, and combinations thereof. A closure is formed. A conductive underlayer is formed between one or more of the at least one devices and the closure.

A tape drive system includes a head as recited above, a drive mechanism for passing a magnetic recording tape over the head, and a controller in communication with the head.

Methods for forming such heads are also presented.

Other aspects and advantages of the present invention will become apparent from the following detailed description, which when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
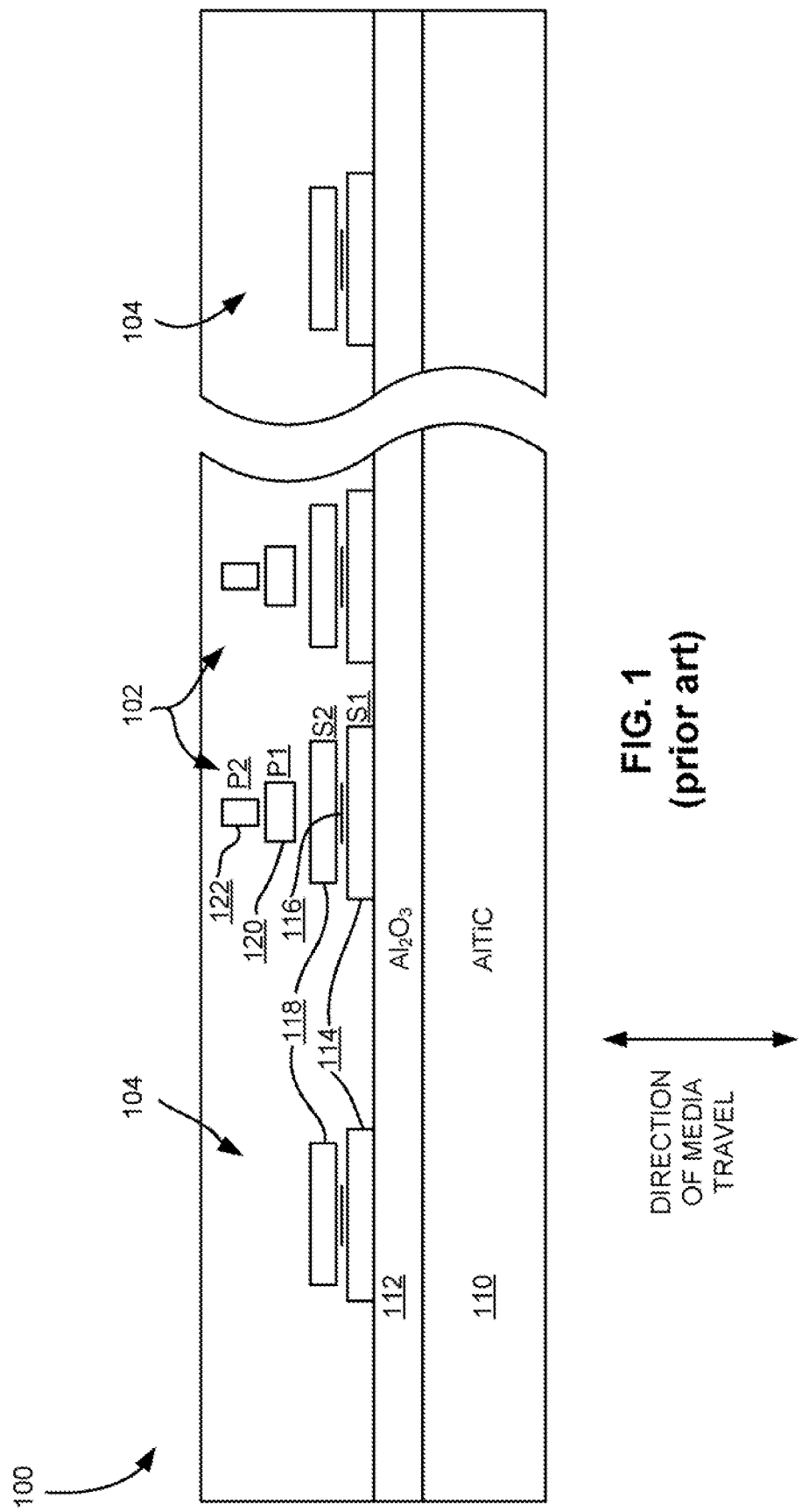
FIG. 1 is a representative view of a typical prior art multi-track tape head having a multitude of readers and writers.

The following description is the best embodiment presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

As described herein, preferred embodiments of the invention includes a magnetic recording head having a conducting thin film layer, herein referred to as a "conductive underlayer", deposited directly on the wafer, before the first magnetic shield insulator. In other embodiments, a thin insulating underlayer is formed between the conductive underlayer and the substrate.

The preferred wafer material for magnetic recording heads is commonly know as AlTiC, which is a ceramic composite material consisting of a sea of insulative aluminum oxide (alumina, $Al_2O_3$) plus an irregular but interconnected network of conductive titanium carbide (TiC). The uneven distribution of TiC creates an irregular electric field that extends into the tape region and into the undercoat insulation. Tis can promote electrical discharges into the insulator in areas where the field is high, e.g., at edges of TiC grains. The discharges have been found to produce pits in any overlay insulation and may play a role in other tape-head material transfer processes. The conductive underlayer in the heads described herein eliminates the electrified "hot spots" and thus provides a uniform electric field at the interface with the sensor lower shield. Another benefit of the conductive underlayer is that it distributes heat and thus can assist in cooling the sensors during operation.

Figure 2:
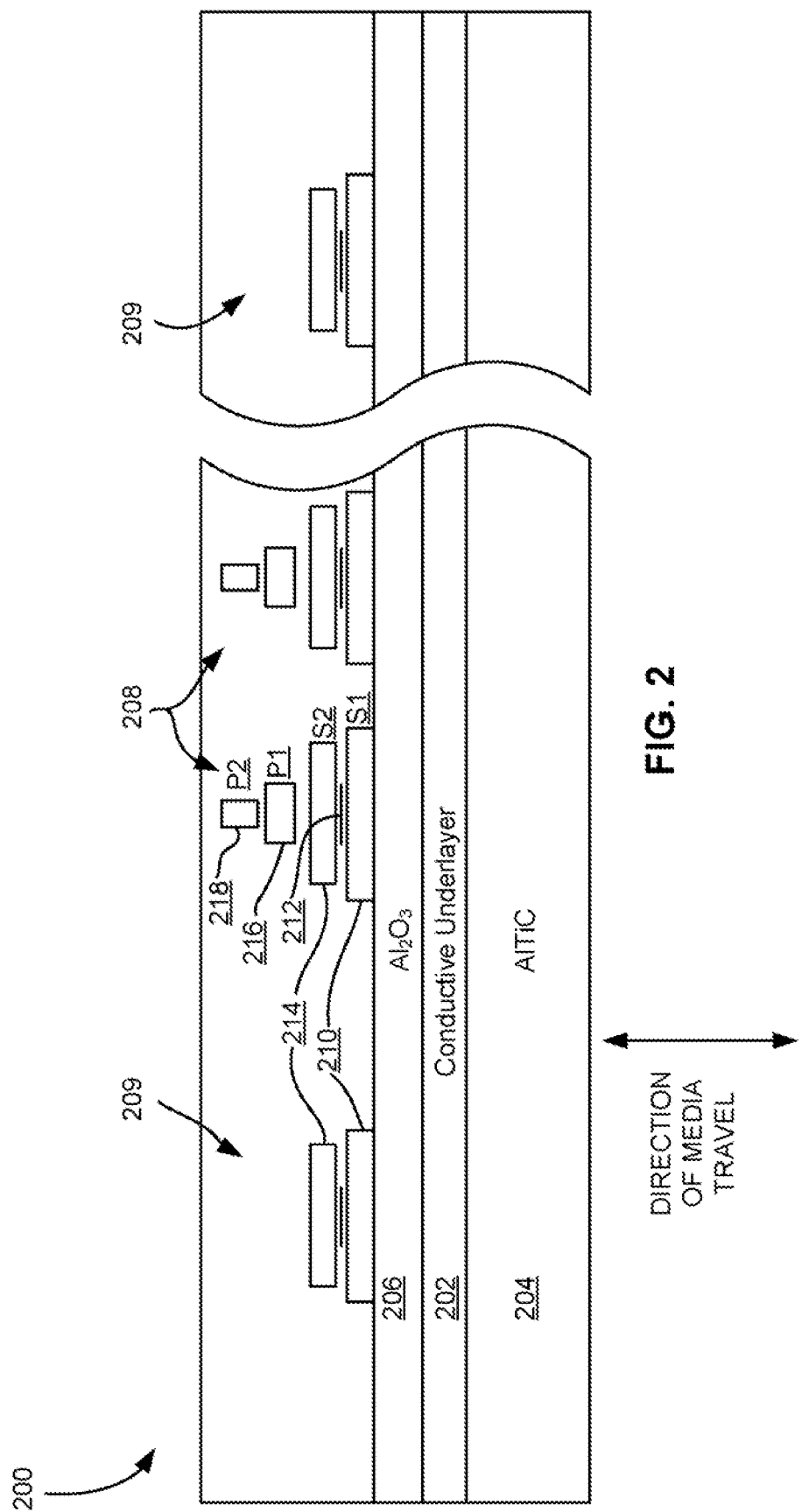
FIG. 2 is a representative view of a multitrack tape head according to one embodiment.

FIG. 2 illustrates a tape head 200 according to an illustrative embodiment of the invention. As shown, a conductive underlayer 202 is formed on a substrate 204 of AlTiC. In a preferred embodiment, the conductive underlayer 202 is formed directly on the substrate 204. Tape heads have 8, 16, 24, or more sets of readers and/or writers per head, and generally the shields of the various R/W pairs 208 must be isolated from one another. Accordingly, an insulating layer 206, e.g., of aluminum oxide, is formed between the lower shields 210 and the conductive underlayer 202.

R/W pairs 208 and servo readers 209 are formed above the insulating layer 206. Each R/W pair includes a reader and a writer. The reader includes a first shield (S1) 210, a sensor 212 also known as a read element or MR element, and a second shield (S2) 214. The writer includes first and second writer pole tips (P1, P2) 216,218. Note also that the second shield 214 and first writer pole tip 216 may be merged into a single structure. Also note that additional layers such as insulation between the shields and/or pole tips and surrounding the sensor, as well as composition and constructions of the R/W pair components, are well known and so description thereof has been omitted.

Figure 3:
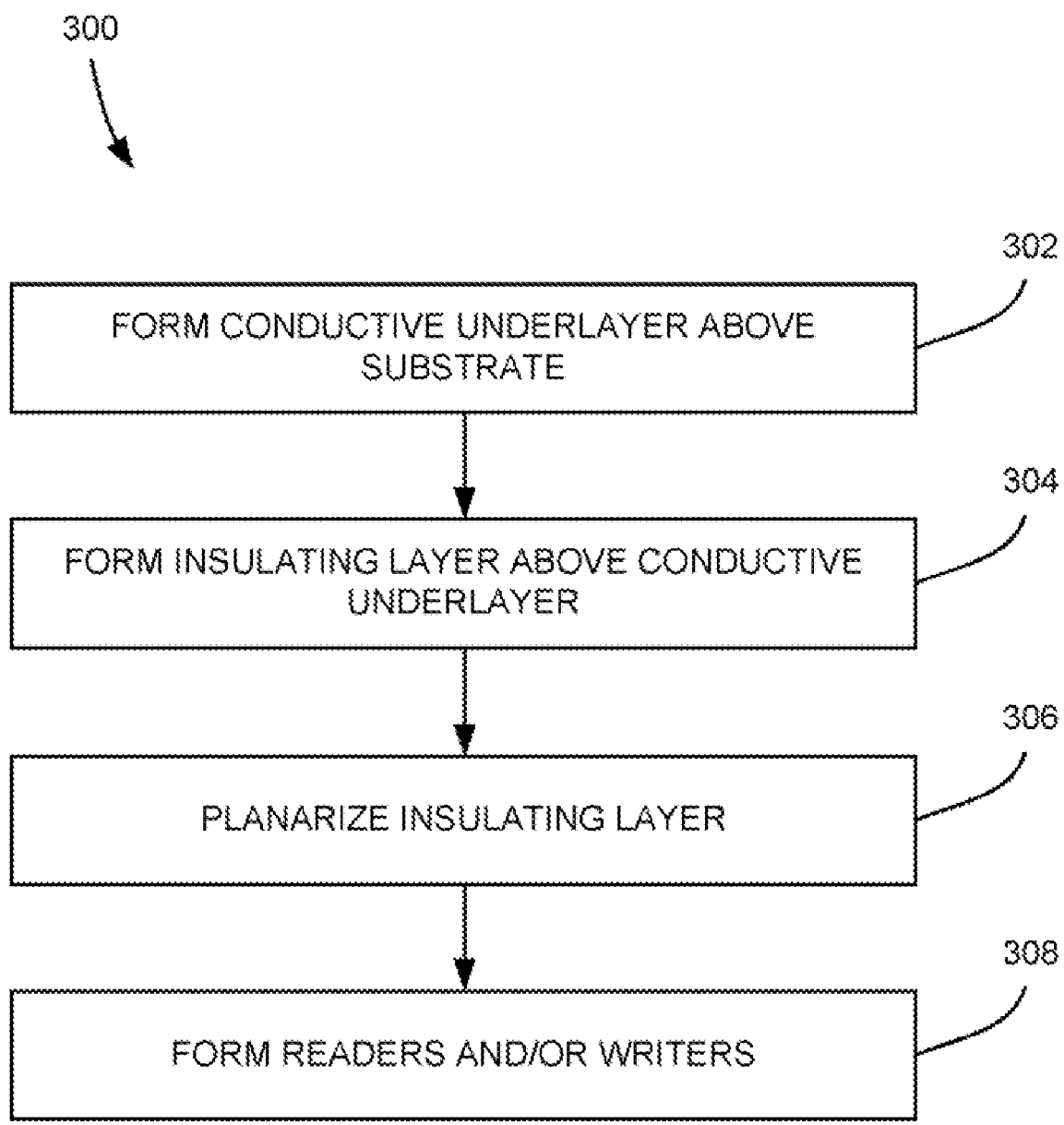
FIG. 3 is a flow diagram depicting a process for forming the head of FIG. 2.

FIG. 3 illustrates a method 300 to implement an embodiment of the invention. In step 302 of the method 300, the conductive underlayer is deposited above, and preferably directly on, the wafer at one of the first steps in processing.

Any suitable process for depositing the conductive underlayer may be implemented, including sputtering, plating (may require conductive seed layer), etc. The deposition step 302 may be followed by deposition of a thin insulating layer above, and preferably on, the conductive underlayer in step 304. A planarization step 306 is performed on the insulating layer, which in turn enables fabricating the magnetic sensors on the insulating layer. In step 308, the various reader and/or writer components are formed above the insulating layer. Note that additional layers may be added without straying from the scope of the invention.

To understand what the conductive underlayer 202 does, one must understand the composition of the substrate 204. For purposes of illustration, a substrate 204 of AlTiC will be described. Note that the same principles apply to other current and future substrates having a composition of conductive and nonconductive grains.

AlTiC has been used extensively in the recording industry because it exhibits excellent thermal and mechanical properties and strikes a good balance between these properties and machinability.

AlTiC is not a uniform material, rather it is a mixture of aluminum oxide powder and TiC grains. The mixture is blended, then compressed under heat and pressure to form a coupon. The finished coupon has good thermal conductivity and very high electrical conductivity. A typical composition is 25-35 wt % or more of TiC grains randomly dispersed in the coupon material.

The coupon is then cut into wafers, and wafer surfaces are polished so that each wafer can be used as a substrate 204. The polished wafer surface has regions of exposed aluminum oxide, and regions of exposed TiC. The TiC is electrically conductive (almost as conductive as some metals), while the aluminum oxide is electrically insulative.

When an electrical contact is placed on the substrate 204 and then connected to a power supply, the conductive regions come to that potential set by the power supply. Particularly, the TiC portions are set, for instance, at 1.5 V relative to ground. Then, electric fields emanate from the grains of TiC. These electric fields have large gradients, as the grains are irregular. Computer modeling performed at the direction of the inventor has shown large electric fields emanating from the grains.

As mentioned above, because AlTiC is electrically conductive, a layer of aluminum oxide is typically placed on the AlTiC substrate 204 to isolate it from the readers and writers. However, excessive electric fields are associated with pitting in the aluminum oxide of the prior art insulating layer. See FIG. 1.

By placing a conductive underlayer 202 directly on the substrate 204, the conductive underlayer 202 will have the same potential as the substrate 204. Now, the electric field emanating from the conductive underlayer 202 and into the insulating layer 206 is reduced in magnitude and uniform. Modeling has shown that the field emanating from the grains of TiC can be 5 times higher (or more) than the fields emanating from the conductive underlayer 202. The diminished and uniform field emanating from the conductive underlayer 202 reduces the pitting of the overlying insulating layer 206 and debris accumulation.

The conductive underlayer 202 can be formed from any conductive material, though good electrical conductors are preferred, i.e., materials with low electrical resistivity. Metals are particularly preferred due to their high electrical conductivity and high thermal conductivity. Illustrative wear resistant metals include Sendust (Al—Si—Fe), NiFe, Ta, etc. Additional conductive materials include conductive ceramics. The conducting underlayer can be magnetic or nonmagnetic. Applying the conducting underlayer enables the designer and manufacturer to use conventional disk and tape head wafer material.

While not foreclosing the following metals from within the scope of the invention, it is believed that the following metals are less desirable choices than other metals described above. Copper may not be a good choice as it may exhibit interactive effects with a tape passing thereacross. Gold may not be a good choice as it may tend to smear due to tape friction.

The conductive underlayer 202 is preferably a few tenths of a micrometer ($\mu$m) thick or more, as measured perpendicular to the deposition plane. An illustrative thickness range is about 0.01 $\mu$m to about 1 $\mu$m thick, though thicker and thinner dimensions can be selected per the desires of the designer. This thickness range has been found to provide the benefits listed herein.

Figure 4:
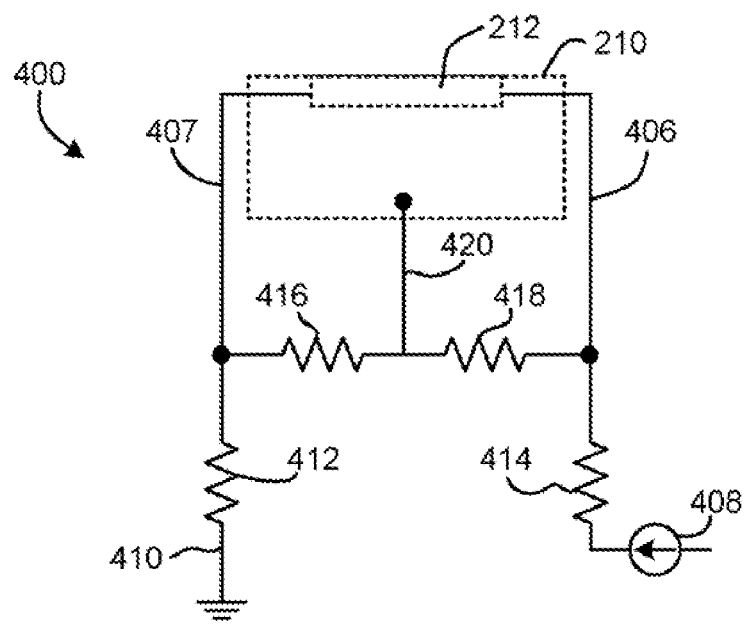
FIG. 4 is a circuit diagram for biasing a shield according to one embodiment.

In many situations, it may be desirable to clamp the potential of the shields 210, 214. FIG 4 depicts an illustrative circuit diagram of a biasing circuit 400 of the MR element 212 and associated shield(s) (lower shield 210 shown, circuit 400 may be coupled to the upper shield 214 (FIG. 2) or both shields 210, 214) according to one embodiment. As shown in FIG. 4, the leads 406, 407 of the MR element 212 are connected to a current source 408 and a ground 410. Reference resistors 412, 414 are present, and are preferably equal to provide common mode rejection of noise picked up by the leads. Illustrative resistance values for the reference resistors are 150$\Omega$ each. Additional resistors 416, 418, typically of about 50K$\Omega$ are positioned on a node 420 coupled to the shield 210. This configuration sets the voltage of the shield 210 at about the average of the two leads 406, 407.

In the embodiment shown in FIG. 4, if the reference voltage is 3.0V, then the voltage on the node coupled to the shield 210 is about 1.5V. Note that these values for voltages and resistance, and indeed this particular circuit diagram, are provided by way of example only, and one practicing the invention is free to select any desired configuration.

The inventor has observed that under certain conditions and with some media, debris can accumulate across the insulating layer 206, creating a conductive path between the lower shield 210 and the conductive underlayer 202. If this happens and the resulting resistance is comparable to the two resistors 416, 418, then the bias current may become diverted and the MR output degraded. This effect is minimized when the conductive underlayer and shields 210 are at the same potential. Thus, in the previous example, because the shield(s) are biased at 1.5V, it is desirable to also set the potential of the conductive underlayer 202 at 1.5V. In embodiments where the conductive underlayer 202 is positioned directly on the substrate 204, this may be accomplished by biasing the conductive underlayer 202 and/or substrate 204 to 1.5V.

However, it is also desirable that the substrate 204 have low AC and DC impedance to ground so that the substrate 204 can act as an electrical shield. Thus, for electromagnetic interference (EMI) shielding, it may be desirable to connect the substrate 204 directly to ground, to ground through a resistor, or to otherwise have a lower potential than the shields. In addition, the substrate and associated circuits may be AC coupled to ground via coupling capacitors.

Figure 5:
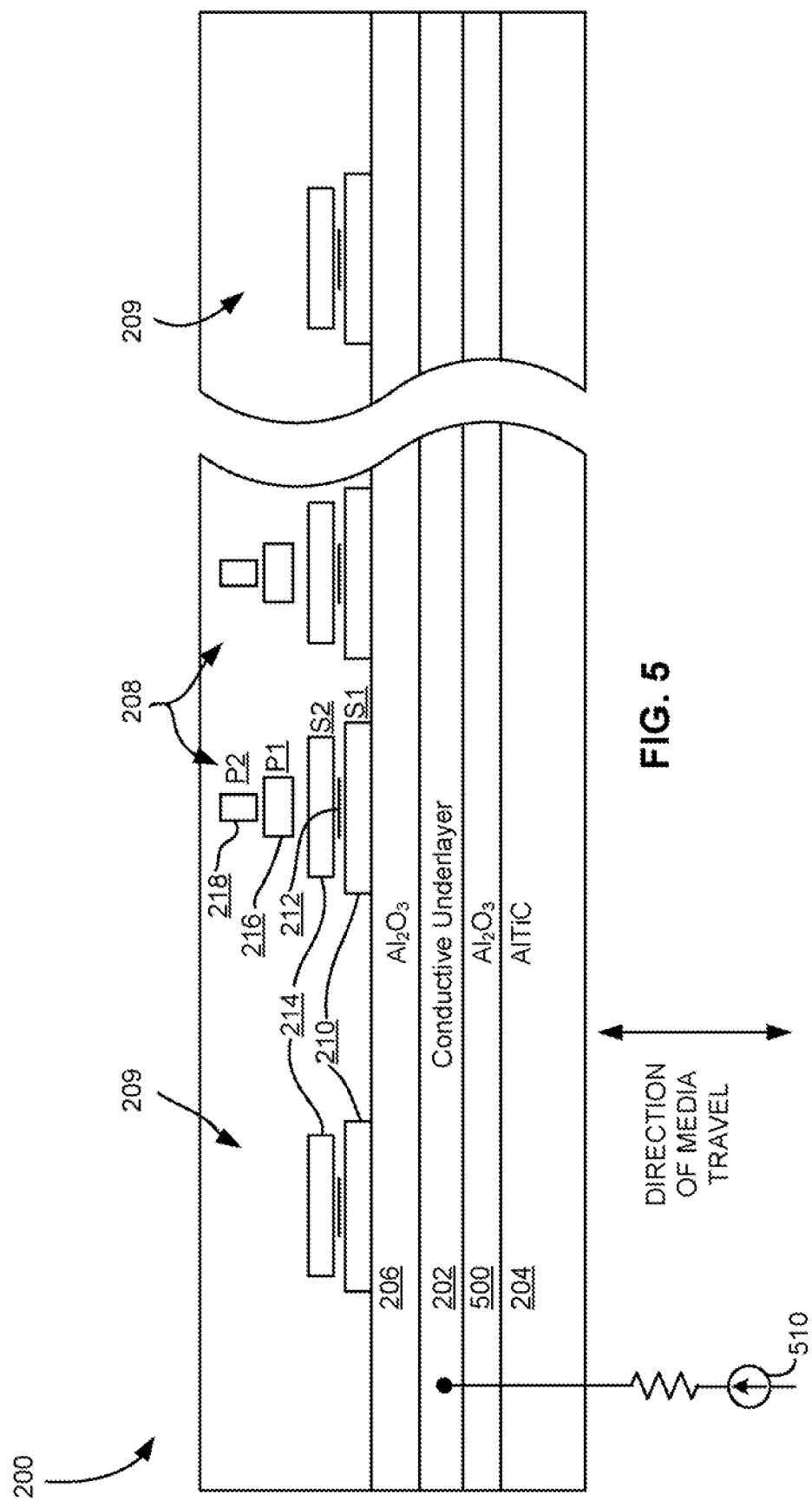
FIG. 5 is a representative view of a multitrack tape head according to one embodiment.

An optional thin insulating underlayer 500 can be formed between the substrate 204 and the conductive underlayer 202, as shown in FIG. 5. Because the conductive underlayer 202 is now isolated from the substrate 204, the designer can set the potential of the conductive underlayer 202 to a value different than that of the substrate 204. If the potential of the conductive underlayer 202 is set to the potential of the shields 210, 214, any occurrence of debris-induced shorting between the lower shield 210 and the conductive underlayer 202 will be of little or no consequence (keeping in mind that it is desirable to isolate the shields 210, 214 in one R/W pair from the shields 210, 214 of the other R/W pairs).

A preferred thickness of the insulating underlayer 500 would be less than about 5 µm and preferably less than about 0.25 µm, e.g., 0.2 µm, 0.1 µm, etc. as measured perpendicular to its plane of deposition. Very thin dimensions of the insulating underlayer 500 (when present) maximize the benefits of the conductive underlayer 202 as described herein. Particularly, the fields emanating from the conductive grains in the substrate 204 are present between the conductive underlayer 202 and substrate 204, and are substantially contained by the conductive underlayer 202.

While any conventional insulating material can be used to form the insulating underlayer, a preferred material for the insulating underlayer 500 is aluminum oxide. In such embodiments, the aluminum oxide layer is preferably a very hard aluminum oxide formed by slow deposition such that it is thin, yet resists the aforementioned pitting. Ideally, the aluminum oxide is sapphire-like, and can be similar to or the same as the aluminum oxide used to insulate the read elements in the head.

The think insulating underlayer 500 also serves as a sacrificial layer for debris accumulation. It is well known that debris from the tape tends to accumulate and even embed in the head. If debris accumulation occurs, it is preferable that it occur in the gap between the substrate 204 and the conductive underlayer 202 rather than between the conductive underlayer 202 and the shield 210.

Figure 6:
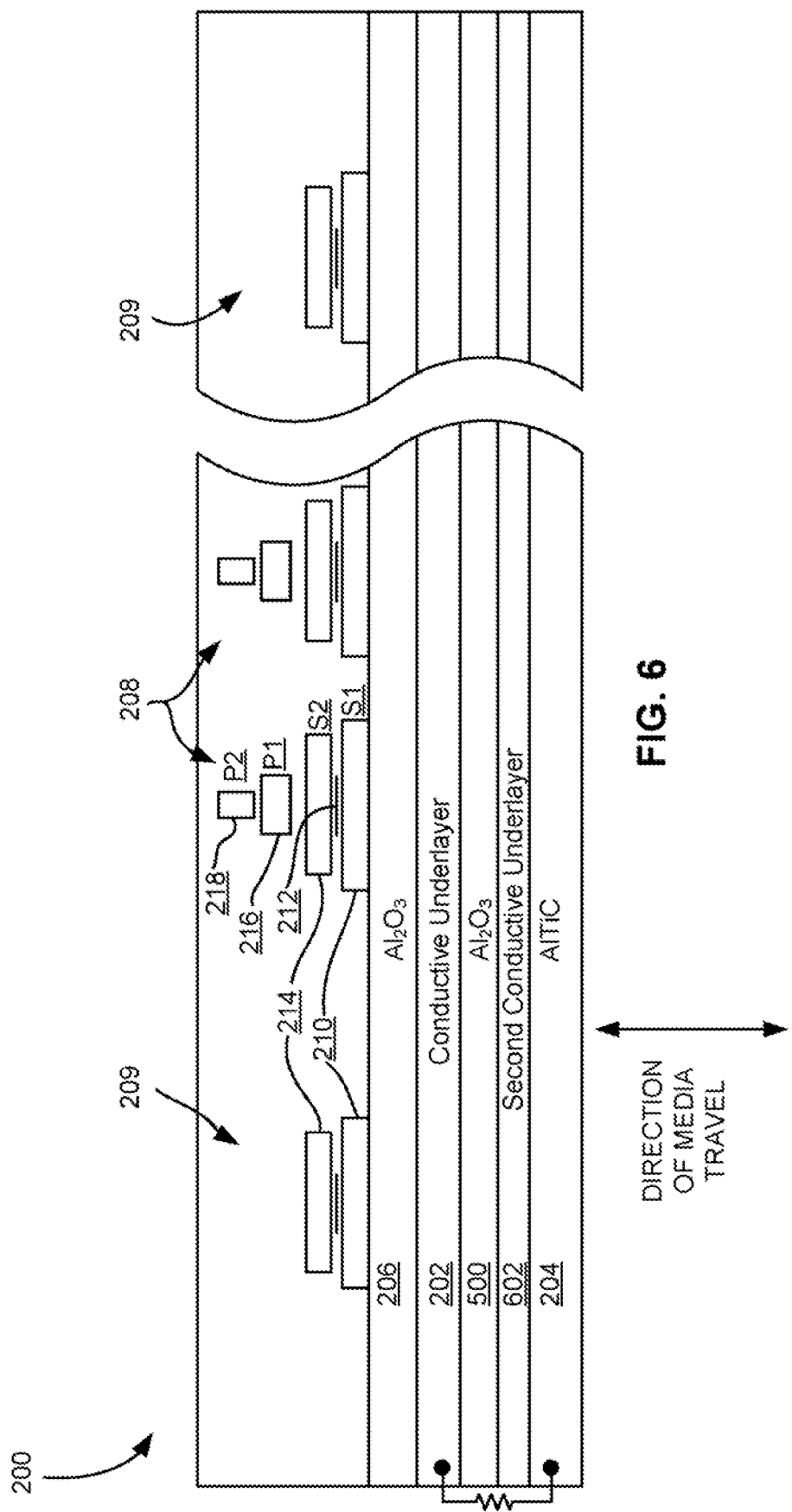
FIG. 6 is a representative view of a multitrack tape head according to one embodiment.

The conductive underlayer 202 of FIG. 5, as well as the other embodiments of the present invention, can be biased by adding a source 510 of alternating or direct current. This allows the voltage of the conductive underlayer 202, for example, to be matched to that of the substrate 204. In a further variation, as depicted in FIG. 6, the conductive underlayer 202 can be electrically coupled to the substrate 204. This also allows voltage matching between the conductive underlayer 202 and the substrate 204.

The embodiment of FIG. 5 may be performed by varying the process of FIG. 3. Particularly, instead of forming the conductive underlayer 202 on the substrate 204 in step 302, the insulating underlayer 500 is formed on the substrate 204, then the conductive underlayer 202 is formed above the insulating underlayer 500.

It should be kept in mind that additional layers may be added from any of the embodiments described herein in each of the possible permutations and variants of the present invention. For example, FIG. 6 depicts a variation of the embodiment shown in FIG. 5, where a second conductive underlayer 602 is positioned between the substrate 204 and the lower insulating layer 500.

Figure 7:
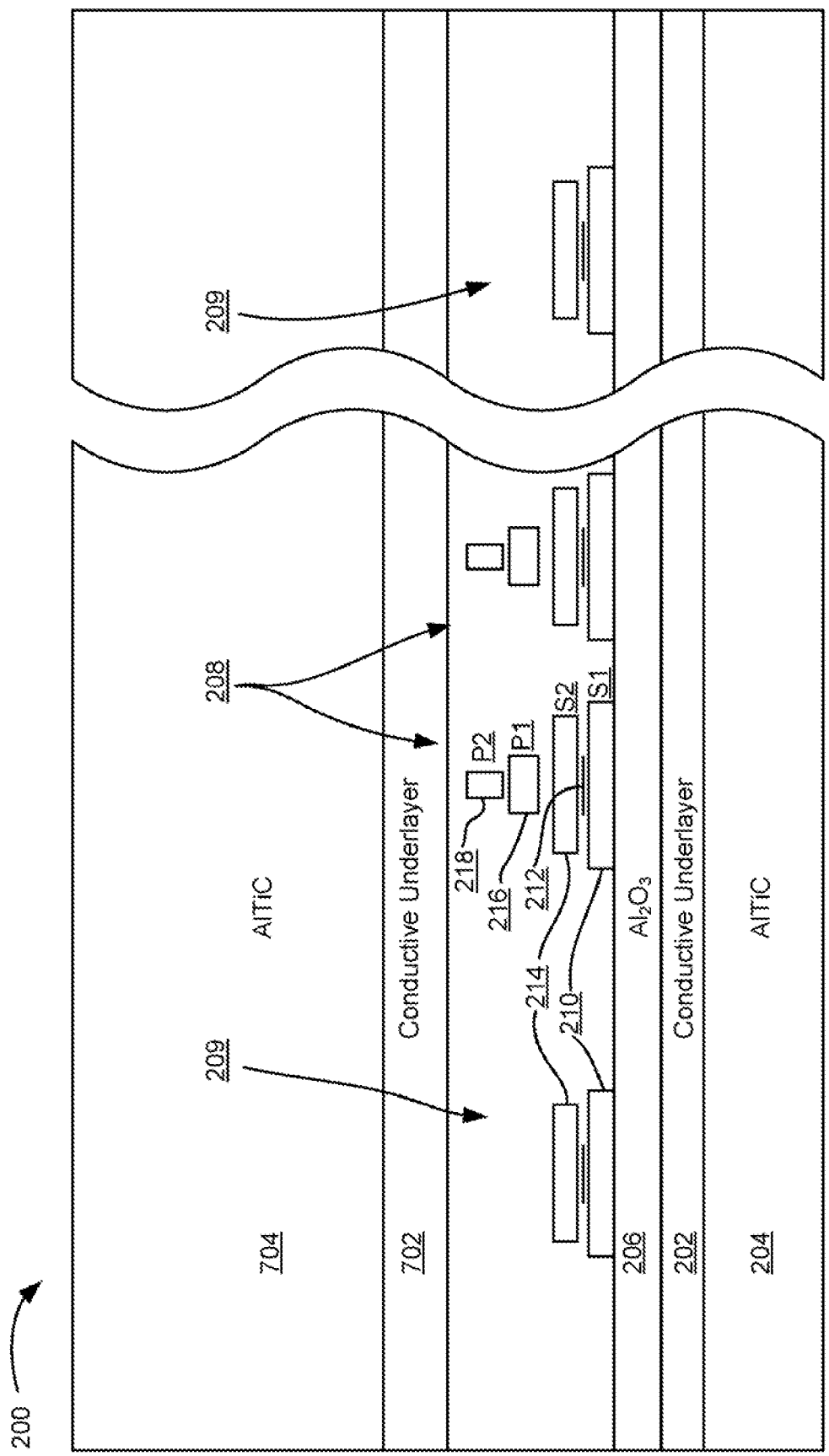
FIG. 7 is a representative view of a multitrack tape head according to one embodiment.

FIG. 7 illustrates yet another embodiment of the head 200 where a conductive underlayer 702 is positioned between a closure 704 and the R/W pairs 208. Because closures are typically constructed of AlTiC and other such materials, the benefits afforded by the closure-side conductive underlayer 702 may be similar to those afforded by substrate-side conductive underlayer 202.

Figure 8:
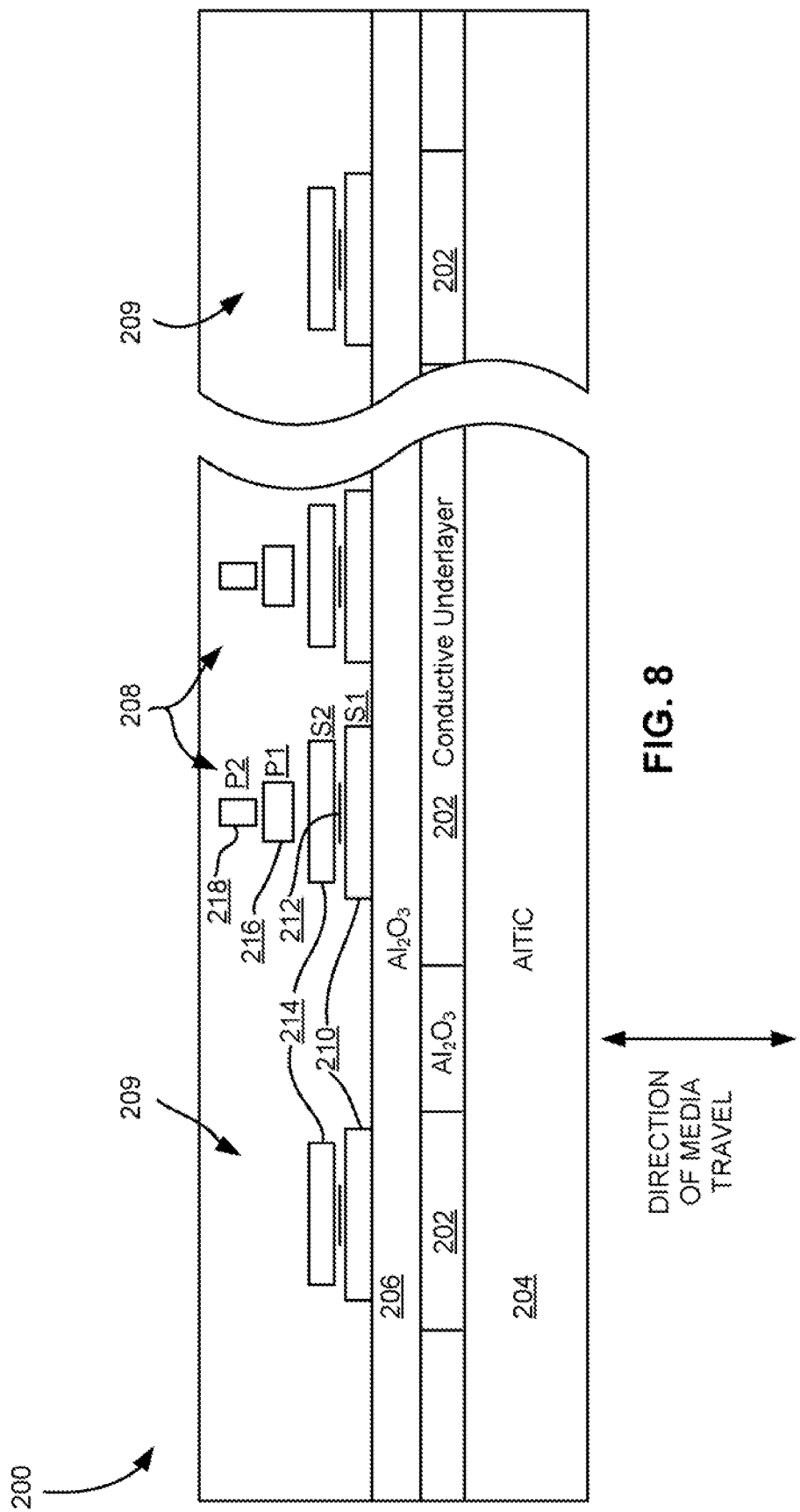
FIG. 8 is a representative view of a multitrack tape head according to one embodiment.

The conductive underlayer(s) in the various embodiments may also be patterned to some desired shape. In one example, shown in FIG. 8, the conductive underlayer 202 is patterned to be located in proximity to the servo readers 209 and/or the array of R/W pairs 208. In another example, not shown, the conductive underlayer can be patterned to be located in proximity to the servo readers and/or each individual R/W pair. Isolated segments of the conductive underlayer further reduce the chance of shorting between the substrate and lower shields.

Any of the above embodiments or combinations of portions thereof can also be applied to any type of magnetic heads and magnetic recording systems, both known and yet to be invented. For example, the teachings herein are easily adaptable to interleaved heads.

Figure 9:
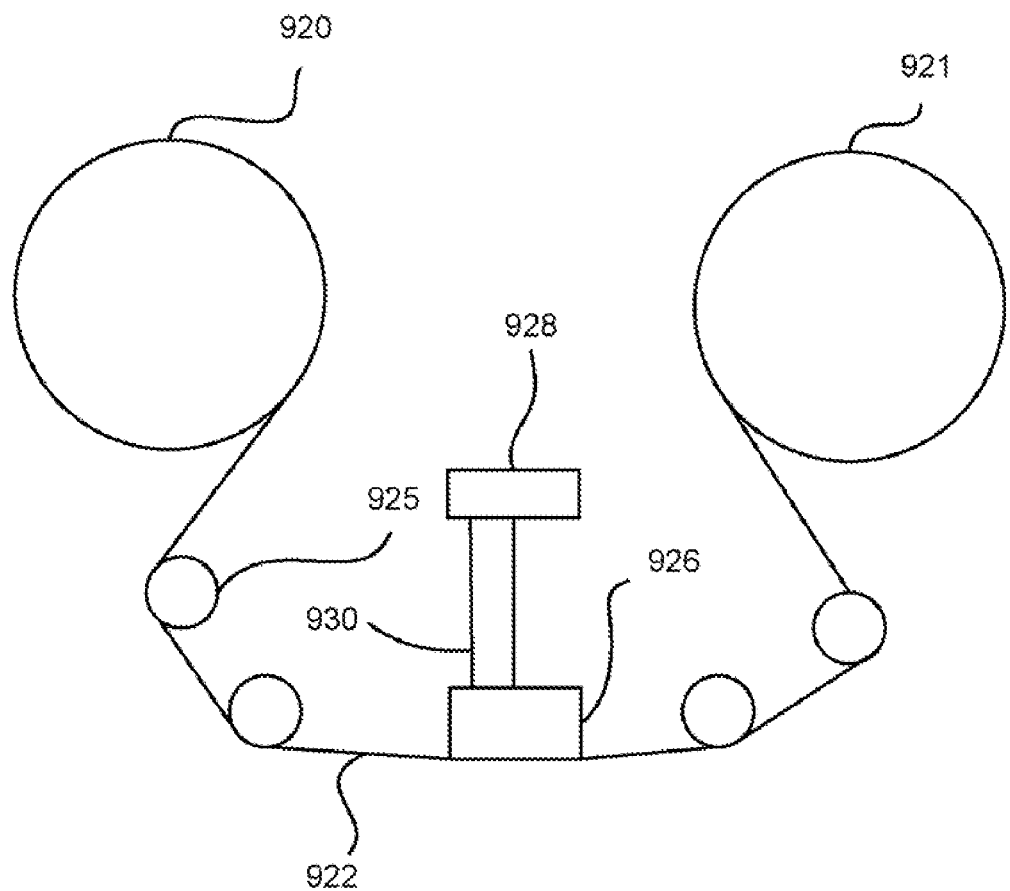
FIG. 9 is a schematic diagram of the tape drive system.

FIG. 9 illustrates a simplified tape drive which may be employed in the context of the present invention. While one specific implementation of a tape drive is shown in FIG. 9, it should be noted that the embodiments of the previous figures may be implemented in the context of other types of magnetic-based systems.

As shown, a tape supply cartridge 920 and a take-up reel 921 are provided to support a tape 922. These may form part of a removable cassette and are not necessarily part of the system. Guides 925 guide the tape 922 across a preferably bidirectional tape head 926, of the type disclosed herein. Such tape head 926 is in turn coupled to a controller assembly 928 via an I/O cable 930. The controller 928, in turn, controls head functions such as servo following, write bursts, read functions, etc.

A tape drive, such as that illustrated in FIG. 9, includes drive motor(s) to drive the tape supply cartridge 920 and the take-up reel 921 to move the tape 922 linearly over the head 926. The tape drive also includes a read/write channel to transmit data to the head 926 to be recorded on the tape 922 and to receive data read by the head 926 from the tape 922. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A magnetic head, comprising:
   a plurality of transducing devices for reading and/or writing to a media;
   a wafer substrate;
   a conductive underlayer formed on the substrate and interposed between the transducing devices and the substrate;
   an insulating layer formed above the conductive underlayer and interposed between the transducing devices and the conductive underlayer; and
   the plurality of transducing devices being formed above the insulating layer and being selected from a group consisting of readers, writers, and combinations thereof,
   wherein each of the readers includes shield layers formed above the insulating layer and positioned on opposite sides of a sensor of the reader.

2. The head as recited in claim 1, wherein the substrate is a composite material comprising a mixture of electrically conductive and nonconductive materials.

3. The head as recited in claim 1, wherein the conductive underlayer is formed directly on the substrate.

4. The head as recited in claim 3, wherein the conductive underlayer is formed of a metal.

5. The head as recited in claim 4, wherein the metal is selected from a group consisting of Sendust, NiFe, Ta, and combinations thereof.

6. The head as recited in claim 1, wherein the plurality of transducing devices includes at least three devices formed above the insulating layer, the conductive underlayer being a single contiguous layer extending under the at least three devices.

7. The head as recited in claim 1, wherein the devices are an array of piggybacked read/write pairs.

8. The head as recited in claim 1, further comprising a closure, and a second conductive underlayer positioned between the closure and one or more of the transducing devices.

9. The head as recited in claim 1, wherein the conductive underlayer is patterned.

10. The head as recited in claim 1, wherein the conductive underlayer has a thickness of between about 0.1 μm to about 1 μm thick as measured perpendicular to a plane of deposition thereof.

11. A tape drive system, comprising:
a head as recited in claim 1;
a drive mechanism for passing a magnetic recording tape over the head; and
a controller in communication with the head.

12. A magnetic head, comprising:
a plurality of transducing devices for reading and/or writing to a media;
a substrate;
an insulating underlayer formed above the substrate and interposed between the transducing devices and the substrate;
a conductive underlayer formed above the insulating underlayer and interposed between the transducing devices and the insulating underlayer;
a second insulating layer formed above the conductive underlayer and interposed between the transducing devices and the conductive underlayer;
the plurality of transducing devices being formed above the second insulating layer and being selected from a group consisting of readers, writers, and combinations thereof; and
at least two shield layers formed above the second insulating layer and positioned on opposite sides of a sensor of each reader to shield that device.

13. The head as recited in claim 12, wherein the plurality of transducing devices includes readers having lower and upper shields, wherein the lower shield of each reader is positioned closer to the second insulating layer than the upper shield, wherein the lower shield is biased at a potential greater than a potential of the substrate.

14. The head as recited in claim 13, wherein the conductive underlayer is biased at a potential about equal to the potential of the lower shield.

15. The head as recited in claim 12, wherein the insulating underlayer is sapphire-like aluminum oxide.

16. The head as recited in claim 12, wherein the insulating underlayer has a thickness of less than about 1 μm as measured perpendicular to a plane of deposition thereof.

17. The head as recited in claim 12, wherein the plurality of transducing devices is an array of the transducing devices, and wherein the conductive underlayer is a single contiguous layer extending under the array of devices.

18. The head as recited in claim 12, wherein the conductive underlayer has a thickness of between about 0.1 μm to about 1 μm thick as measured perpendicular to a plane of deposition thereof.

19. A tape drive system, comprising:
a head as recited in claim 12;
a drive mechanism for passing a magnetic recording tape over the head; and
a controller in communication with the head.

20. A magnetic head, comprising:
a plurality of transducing devices for reading and/or writing to a media;
a substrate;
an electrically conductive underlayer formed from a non-magnetic material above the substrate and wherein the electrically conductive underlayer is a single contiguous layer interposed between the transducing devices and the substrate; and
an insulating layer formed above the electrically conductive underlayer and interposed between the transducing devices and the electrically conductive underlayer;
wherein the plurality of transducing devices are formed above the insulating layer, the transducing devices being selected from a group consisting of readers, writers, and combinations thereof.

* * * * *